US012784252B2

(12) United States Patent
Wang et al.

(10) Patent No.: US 12,784,252 B2
(45) Date of Patent: Nov. 3, 2026

(54) VISUAL LOCALIZATION

(71) Applicant: Microsoft Technology Licensing, LLC, Redmond, WA (US)

(72) Inventors: Rui Wang, Zurich (CH); Christoph Vogel, Zurich (CH); Changan Chen, Zurich (CH); Marc Andre Leon Pollefeys, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 18/420,753

(22) Filed: Jan. 23, 2024

(65) Prior Publication Data

US 2025/0238950 A1 Jul. 24, 2025

(51) Int. Cl.
*G06T 7/70* (2017.01)

(52) U.S. Cl.
CPC ...... *G06T 7/70* (2017.01); *G06T 2207/20084* (2013.01)

(58) Field of Classification Search
None
See application file for complete search history.

(56) References Cited

U.S. PATENT DOCUMENTS

2019/0005719 A1* 1/2019 Fleischman ............. G06T 7/579
2024/0312136 A1* 9/2024 Narayana ................ G06T 7/337

FOREIGN PATENT DOCUMENTS

CN 112270701 A * 1/2021 ........... G06F 18/214

OTHER PUBLICATIONS

Min, Z., Khosravan, N. et al. (2022). LASER: LAtent SpacE Rendering for 2D Visual Localization. Proceedings (IEEE Computer Society Conference on Computer Vision and Pattern Recognition. Online), 11112-11121. https://doi.org/10.1109/CVPR52688.2022.01084 (Year: 2022).*

Howard-Jenkins, H., & Prisacariu, V. A. (2022). LaLaLoc++: Global Floor Plan Comprehension for Layout Localisation in Unvisited Environments. In Computer Vision—ECCV 2022 (vol. 13687, pp. 693-709). Springer. https://doi.org/10.1007/978-3-031-19812-0_40 (Year: 2022).*

Sarlin, P.-E. et al. (2023). OrienterNet: Visual Localization in 2D Public Maps with Neural Matching. Proceedings (IEEE Computer Society Conference on Computer Vision and Pattern Recognition. Online), 21632-21642. https://doi.org/10.1109/CVPR52729.2023.02072 (Year: 2023).*

Boniardi, et al., "Robot Localization in Floor Plans Using a Room Layout Edge Extraction Network", arXiv:1903.01804v1, Mar. 5, 2019, 07 Pages.

(Continued)

*Primary Examiner* — Amandeep Saini
*Assistant Examiner* — Caroline Tabancay Duffy
(74) *Attorney, Agent, or Firm* — Workman Nydegger

(57) ABSTRACT

Examples describe using a two dimensional floor plan, rather than a three dimensional (3D) reconstruction of a scene, to localize a camera. A floorplan of an environment is accessed and an image of the environment captured by a camera in the environment is received. The image is input to a trained neural network to predict an array of rays from the camera to surfaces in the environment indicated in the floorplan. Using the array of rays it is then possible to compute 3D position and orientation of the camera with respect to the floorplan.

20 Claims, 7 Drawing Sheets

(56) References Cited

OTHER PUBLICATIONS

Chen, et al., "F3 Loc: Fusion and Filtering for Floorplan Localization Supplementary Material", In Computer Vision Foundation, Mar. 30, 2024, 10 Pages.
Chen, et al., "F3Loc: Fusion and Filtering for Floorplan Localization", Proceedings of the IEEE/CVF Conference on Computer Vision and Pattern Recognition (CVPR), 2024, pp. 18029-18038.
Extended European search Report Received in European Patent Application No. 25153418.6, mailed on Apr. 15, 2025, 09 pages.
Jenkins, et al., "LaLaLoc: Latent Layout Localisation in Dynamic, Unvisited Environments", In International Conference on Computer Vision, 2021, pp. 10107-10116.
Jenkins, et al., "LaLaLoc++: Global Floor Plan Comprehension for Layout Localisation in Unvisited Environments", In European Conference on Computer Vision, 2022, 17 pages.
Jonschkowski, et al., "End-to-end learnable histogram filters", In Workshop on Deep Learning for Action and Interaction at NIPS, 2016, 11 pages.
Karkus, et al., "Particle Filter Networks with Application to Visual Localization", In 2nd Conference on Robot Learning, 2018, 10 pages.
Krizhevsky, et al., "ImageNet Classification with Deep Convolutional Neural Networks", In Neural Information Processing Systems, 2012, 9 pages.
Min, et al., "LASER: LAtent SpacE Rendering for 2D Visual Localization", In Conference on Computer Vision and Pattern Recognition, 2022, pp. 11122-11131.
Qi, et al., "PointNet: Deep Learning on Point Sets for 3D Classification and Segmentation", In Conference on Computer Vision and Pattern Recognition, 2017, pp. 652-660.
Sarlin, et al., "OrienterNet: Visual Localization in 2D Public Maps with Neural Matching", In Conference on Computer Vision and Pattern Recognition, 2023, pp. 21632-21642.
Welch, et al., "An Introduction to the Kalman Filter", In Technical Report, University of North Carolina, Jul. 24, 2006, 1995.
Yao, et al., "Mvsnet: Depth inference for unstructured multi-view stereo", In European Conference on Computer Vision, 2018, 17 pages.

* cited by examiner

VISUAL LOCALIZATION

BACKGROUND

Visual localization, also referred to as visual odometry, is the process of computing 3D position and orientation of a camera in an environment using images depicting the environment captured using the camera. Visual odometry is complex and time consuming. The 3D position and orientation of the camera is typically computed with respect to a 3D representation of the environment that has been computed using point clouds depicting the environment captured using a depth sensor associated with the camera. Constructing the 3D representation of the environment is time consuming and has to be done for each environment such as each room of a domestic home where camera localization is to be used. Constructing the 3D representation of the environment brings computational burden.

The embodiments described below are not limited to implementations which solve any or all of the disadvantages of known visual localization processes.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Examples describe using a two dimensional floor plan, rather than a three dimensional, 3D, reconstruction of a scene, to localize a camera.

A floorplan of an environment is accessed and an image of the environment captured by a camera in the environment is received. The image is input to a trained neural network to predict an array of rays from the camera to surfaces in the environment indicated in the floorplan. Using the array of rays it is then possible to compute 2D position and orientation of the camera with respect to the floorplan.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
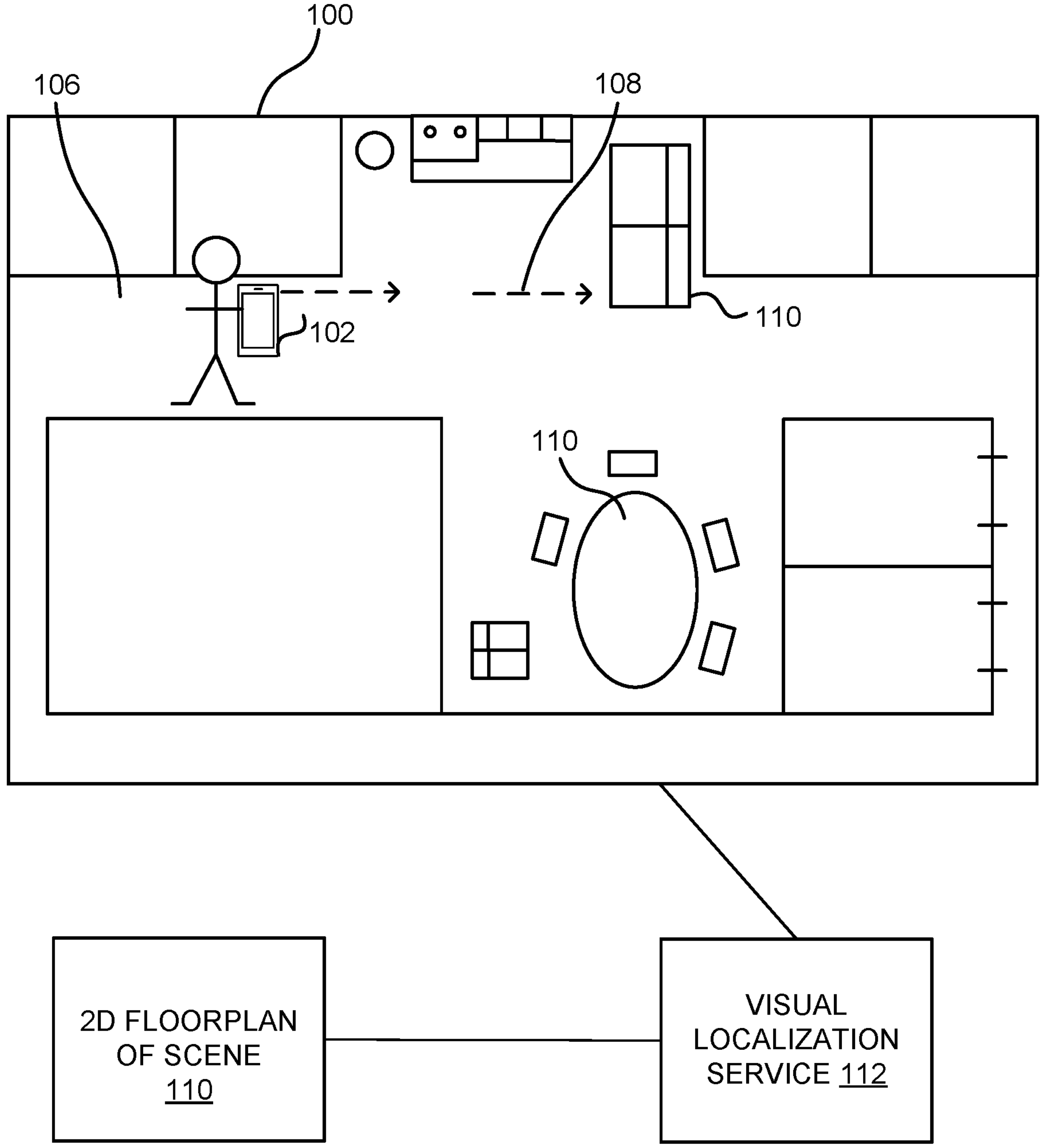
FIG. 1 is a schematic diagram of a visual localization service.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Camera localization is used in many augmented reality (AR) and virtual reality (VR) applications for head-mounted or handheld mobile devices. Camera localization is also used in robotics and autonomous vehicles. Most existing approaches localize the camera using a pre-collected database of images of the environment or by localizing within a pre-built 3D model of the scene. Image retrieval based methods of visual localization find the most similar image in a database and estimate the query image pose using the pose of the retrieved one. Visual localization methods based on a pre-built 3D structure from motion model of the environment establish 2D-3D correspondences between a query image and the 3D structure by matching local descriptors and compute the image pose using minimal solvers and random sample consensus (RANSAC). However, pre-collected databases of images and 3D scene models are costly in terms of storage and maintenance especially because many databases or many 3D models are needed, one per environment the camera will be localized in.

Scene coordinate regression is an approach to visual localization that learns to regress the 3D coordinates of the pixels in the query image. Pose regression methods use a neural network to directly regress a 6D camera pose from the input image. These methods rely on a pre-built 3D model that requires large storage and are scene-specific, which renders them unable to handle unvisited environments.

In contrast, indoor environments including most commercial real estate such as warehouses, offices and apartments already possess a two dimensional (2D) floorplan. A floorplan is a two dimensional map (also referred to as a bird's eye view) of an environment that represents walls as lines and indicates windows, stairwells, doorways and the like using different types of lines. A floorplan is typically drawn to scale, that is a unit of distance in the floorplan is directly proportional to a unit of distance in the environment the floorplan represents. A floorplan represents an indoor environment and represents long-term scene structure; that is a floorplan generally omits furniture and domestic objects such as indoor plants, pictures, televisions, and other movable objects.

A floorplan is a generic representation for indoor environments that is easily accessible, lightweight, and preserves long-term scene structure independent of a changing visual appearance, such as the furnishing of the scene. It encodes rich enough information that humans can localize in an unvisited scene with its help. An unvisited scene is an environment that a particular human user has never been in before or for which the visual localization service has not previously been used.

In various examples a camera is localized with respect to a given floorplan. This is useful for indoor AR/VR applications such as floorplan navigation and also empowers robot autonomy in indoor exploration, navigation as well as search and rescue. The methods described herein are optionally used in conjunction with indoor simultaneous localization and mapping (SLAM) functionality. The methods described herein are able to compute 3D position and 3D orientation of a camera in a way that can be used to detect and verify loop closures. Some methods described herein compute 2D position and orientation within a floorplan. A loop closure is where a camera moves in an environment along a track from a start position in a first room, through a second room, and back to the first room. Detecting the start position has been re-encountered at the end of the track is referred to as detecting a loop closure. Detecting loop closure is difficult to achieve since the images of the environment captured when the start position is re-encountered are typically from a different viewpoint than the images captured at the start of the track. Also, due to drift in a SLAM algorithm that occurs as the camera moves along the track there can be need to re-localize the camera (i.e. compute the 3D position and orientation again rather than continue to extrapolate or compute relative pose updates of the camera as it moves along the track). The term pose is used to refer to 3D position and orientation which may be a 6 dimensional quantity (three dimensions for position and three dimensions for orientation).

The inventors have recognized that floorplans contain many repetitive structures such as corners and walls which produces ambiguity and leads to problems regarding visual localization. Where visual localization is to be carried out with respect to a floorplan, because of the repetitive structures in a floorplan, there may be more than one place in the floorplan that a camera is localized to. Sensor data captured by the camera depicting the environment represented by the floorplan may be consistent with more than one location in the floorplan. This causes ambiguity in the visual localization.

In various examples, a floorplan of an environment is accessed and an image of the environment captured by a camera in the environment is received. By using a floorplan it is possible to operate the visual localization service even where there is no other data available about the environment. The image is input to a trained neural network to predict an array of rays from the camera to surfaces in the environment indicated in the floorplan. The array of rays is an extremely compact representation because it is a plurality of straight lines and it is much more efficient to store and manipulate than an image or a 3D model. The array of rays is a plurality of rays and is a 2D or a 3D array where the rays are spaced from one another in a known spacing. The array is either regular, where the rays are spaced using equiangular spacings, or is irregular. Using a 2D array of rays is a more compact representation than a 3D array of rays. Using equiangular spacing gives a more compact representation of the array than where the spacing is irregular. Using the array of rays it is then possible to compute 3D position and orientation of the camera with respect to the floorplan. This gives a highly efficient and effective way to achieve visual localization. In some examples, an icon representing the camera is automatically moved in a representation of the floorplan on a user interface. The icon is automatically moved in the user interface according to the computed 3D position and orientation of the camera with respect to the floorplan.

FIG. 1 is a schematic diagram of a visual localization service 112 deployed as a cloud service. The visual localization service 112 is computer implemented using any combination of software, firmware and hardware and is deployed at one or more compute nodes in a communications network accessible by a portable computing device with a camera, such as camera phone 102. The visual localization service is able to receive images captured by the camera phone 102 sent to the visual location service using a wired or wireless connection via a communications network. The images may be compressed and optionally encrypted before being sent from the camera phone 102 to the visual localization service. Optionally other sensor data captured by the camera phone 102 is also sent to the visual localization service 112 such as gravity direction data from an accelerometer, gyroscope, inertial measurement unit or other gravity sensor.

The visual localization service has access to a 2D floorplan 110 of the environment the camera phone 102 is in. The 2D floorplan 110 may be stored in a database of floorplans accessible to the visual localization service 112 or may be sent to the visual localization service by another entity.

FIG. 1 shows an example of a person holding a camera phone 102 and walking in the direction of dotted arrows 108 along a corridor 106 within an office environment 100. The office has furniture 120 such as tables, chairs, sofas, kitchen cupboards. The office has internal walls as explained with reference to FIG. 2. As the user walks along corridor 106 the camera phone 102 captures images depicting the environment which are sent to the visual localization service 112. The visual localization service uses the images to compute a 2D position and orientation of the camera phone 102 with reference to a 2D floorplan 110 of the environment or scene. The 2D position and orientation of the camera phone 102 is returned to the camera phone 102 and/or sent to downstream processes such as an AR or VR application or a navigation application.

The visual localization service is able to operate in real-time (i.e. at 30 frames per second or higher) with domestic hardware (including but not limited to: a portable computing device, a smart phone, a tablet computer, head worn computer) and is able to accurately compute 2D position and orientation of the camera. This is achieved without the need for a 3D representation of the environment and by using only a 2D floorplan 110 of the scene. Therefore there is less processing load as compared with approaches where a 3D representation of the environment is constructed from sensor data. Less bandwidth is used where the floorplan is sent over a communication link as compared with sending a 3D representation of the environment.

Alternatively, or in addition, the functionality of the visual localization service 112 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
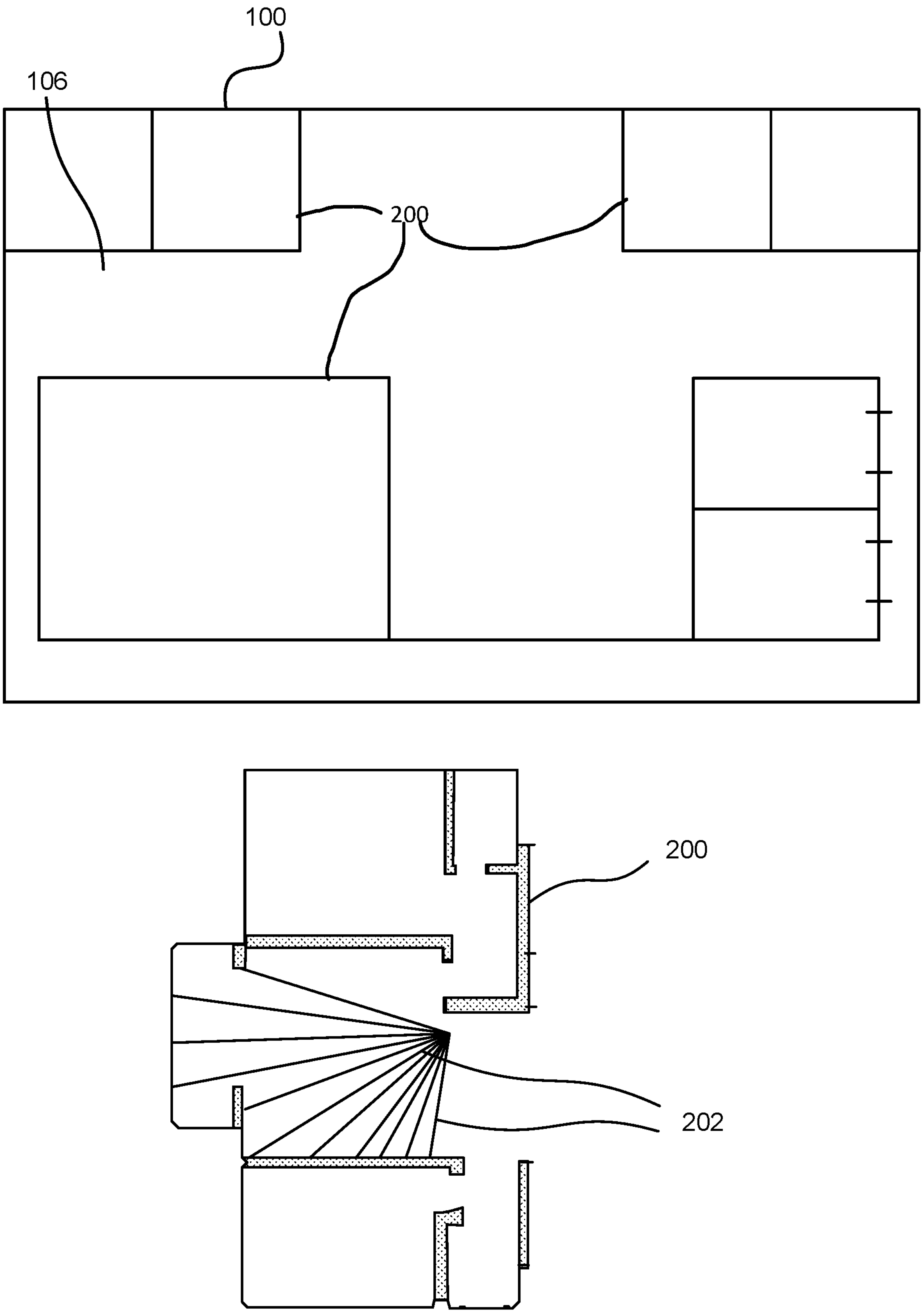
FIG. 2 shows two example floorplans and an array of rays.

FIG. 2 shows two example floorplans and an array of rays. In the upper part of FIG. 2 is a floorplan for the office environment 100 shown in FIG. 1. It shows walls 200 of rooms inside the office on either side of corridor 106. The furniture visible in FIG. 1 is not present in the floorplan.

In the lower part of FIG. 1 is another floorplan also showing walls 200 forming rooms and passageways and entrances/exits. An array of rays 202 is shown in one of the rooms. The array of rays emanates from a viewpoint which is a virtual camera location. The rays are straight lines and, in this example, are spaced apart from one another with equiangular separations. Each ray in the array of rays 202 extends from the viewpoint, generally horizontally with respect to a floor of the environment, to one of the walls represented by the floorplan. Because the viewpoint is located at an entrance to a room the array of rays emanates forwards through the room so the rays terminate on walls at the edges of the room. It is found that an array of rays is a particularly efficient and effective representation of the camera 2D position and orientation. Given an array of rays, it is possible to search for viewpoints in a floorplan which are consistent with the array of rays. The array of rays is preferably planar and so can be drawn onto a 2D floorplan as illustrated in the bottom part of FIG. 2. In various examples, computing the 2D position and orientation of the camera with respect to the floorplan comprises searching for a pose in the floorplan that has the most similar rays as a predicted array of rays predicted by a trained machine learning model. Similarity is computed using any suitable similarity metric. In an example, statistics of the arrays are computed, such as total length of all the rays, average ray length, and the statistics are compared by subtraction. In another example, the similarity is measured by superimposing the arrays and computing a difference between them; if the difference is below a threshold the arrays are similar. The machine learning model has been trained using other floorplans (not the floorplan of the current environment). The machine learning training omits information about the floorplan of the particular environment where the visual localization service is being used and omits images captured in the particular environment.

An array of rays can be stored in compact form in a computer memory since it comprises straight lines and lengths. As compared with an image an array of rays is much more compact. An array of rays is independent of parameters intrinsic to a particular camera, such as focal length, shutter speed and other camera intrinsics, which is very useful because it enables the visual localization service to work with any camera.

Using an array of rays facilitates security since it reveals only information about straight lines and distances; there is no information about furniture or people in the room in contrast to visual localization approaches that use 3D models formed from point clouds or other sensor data captured from an environment.

The inventors have recognized that often, a person holding a camera phone in a scenario such as that of FIG. 1, may hold the camera off-vertical. That is, people do not typically have dexterity to hold a camera phone perfectly vertical whilst walking along in an indoor environment. Using high cost sensors which are able to automatically capture images with consistent upright camera pose is usually not an option. Being able to carry out visual localization even where the images captured by the camera are not necessarily from an upright camera pose is difficult. In some examples, the present technology uses a sensor (such as an inertial measurement unit, gyroscope or accelerometer) associated with the camera to determine a gravity direction and aligns images captured by the camera with the gravity direction prior to inputting the images to the trained machine learning model. This facilitates operation even where low cost sensors are used which may not be upright in usc. The machine learning model itself may be trained using training data that is augmented synthetically to allow for different roll or pitch of a camera and this improves accuracy of the visual localization process where low cost sensors are used which may not be upright in use.

Figure 3:
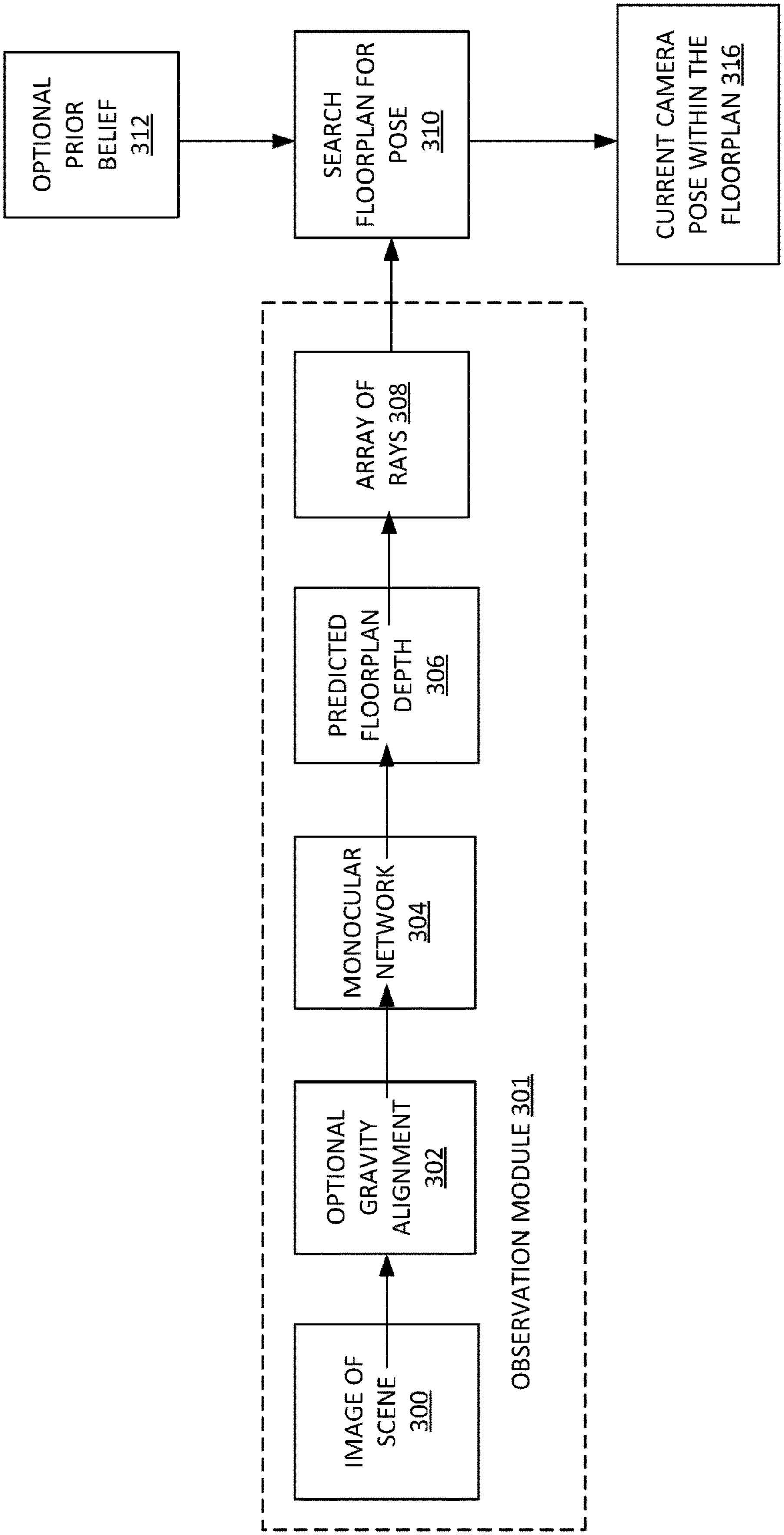
FIG. 3 is a flow diagram of a process of visual localization using a monocular network.

FIG. 3 is a flow diagram of a process of visual localization, performed by a visual localization service such as that of FIG. 1, using a monocular network (without a multi-view network). In this example the trained neural network comprises a first neural network which computes the predicted array of rays from only one image. An image of a scene is received 300 such as from a camera phone or an image sensor on a robot in an environment. Optional gravity alignment 302 is performed on the image by using information from a gravity sensor associated with the image of the scene. The gravity alignment comprises rotating the image such that a vertical axis of the image is aligned with gravity. An attention mechanism of the first neural network may be used to mask out pixels that become unobservable by the gravity alignment.

The optionally gravity aligned image is input to a monocular neural network 304. The monocular neural network 304 is a neural network that takes as input only a single image. The monocular neural network predicts a floorplan depth 306 which is a one dimensional array corresponding to the image of the scene 300 and where each image element position in the array contains a numerical value representing distance from a camera which captured the image of the scene 300 to a surface in the scene.

In an example the monocular neural network comprises a local image feature extraction neural network and an attention neural network to learn a probability distribution of the floorplan depth over a range of depth hypotheses. Pixels that become unobservable by the gravity alignment are masked out in the attention. The expectation is used as the floorplan depth prediction.

In an example, the local image feature extraction neural network is a residual neural network such as ResNet50 and another convolutional layer is used to reduce channel size. However, any local image feature extraction neural network can be used such as a multi-layer perceptron, DenseNet, a convolutional neural network, Alexnet, vgg19, inception, mobilenet, squeezenet.

The features predicted by the local image feature extraction neural network are used as keys and values for the attention neural network. A pooling, such as an average pooling or other aggregation, is applied vertically to form queries for the attention neural network. For each query, the attention is applied to the entire image. For the queries, use their 1D coordinate to form a positional encoding, whereas for the keys and values the positional encoding is mapped from the corresponding 2D image coordinate. Using an attention neural network gives a benefit that it is possible for unobservable pixels (i.e. pixels that become unobservable by the gravity alignment) to be masked out in the attention. The monocular neural network outputs a probability distribution of floorplan depth, evaluated at a plurality of predefined depth hypotheses. The distribution is provided directly by the attention neural network.

The monocular network 304 has been trained in advance as described in more detail later with reference to FIG. 6. The training is done using training examples from other environments and their associated floorplans; that is the monocular network 304 is training using data excluding information about the current floorplan and excluding information about the current environment or scene. The trained neural network has been trained using other floorplans and wherein the training omits information about the floorplan and omits images captured in the environment. Thus the visual localization service is extremely flexible and versatile because it can be used for new environments and does not have to be trained for particular environments. In some examples the training images comprise at least one synthetic image computed by updating one of the images according to an adjusted roll or an adjusted pitch of the camera; this is found to improve robustness of the visual localization service to non-upright camera poses.

The visual localization service constructs an array of rays 308 from the predicted floorplan depth 306 using geometry and rules. A search 310 in the floorplan is done by the visual localization service to find a position and orientation of a camera with respect to the floorplan that best agrees with the array of rays 308. The position and orientation of the camera which is found is stored or output 316 by the visual localization service as the current camera pose with respect to the floorplan. The search 310 is made particularly efficient in some cases by pre-computing, for various virtual camera poses, what the array of rays 308 would be given the floorplan. It is then possible to compute the search 310 very quickly by searching the pre-computed arrays of rays to find one that best matches the observed array of rays 308.

Optionally the search 310 for the camera pose in the floorplan is influenced or constrained by a prior belief 312 of the camera pose as explained in more detail later. The prior belief 312 of the camera pose may be a camera pose obtained by the visual localization service at a previous time step and/or may comprise other information. The search may comprise searching for a pose in the floorplan that has the most similar rays as the predicted array of rays.

In the example of FIG. 3 some of the operations are illustrated as being part of an observation module 301 of the visual localization service. The monocular network of the disclosure operates in an unconventional manner to enable a memory efficient representation, the array of rays to be computed, to give accurate efficient visual location of a camera.

Figure 4:
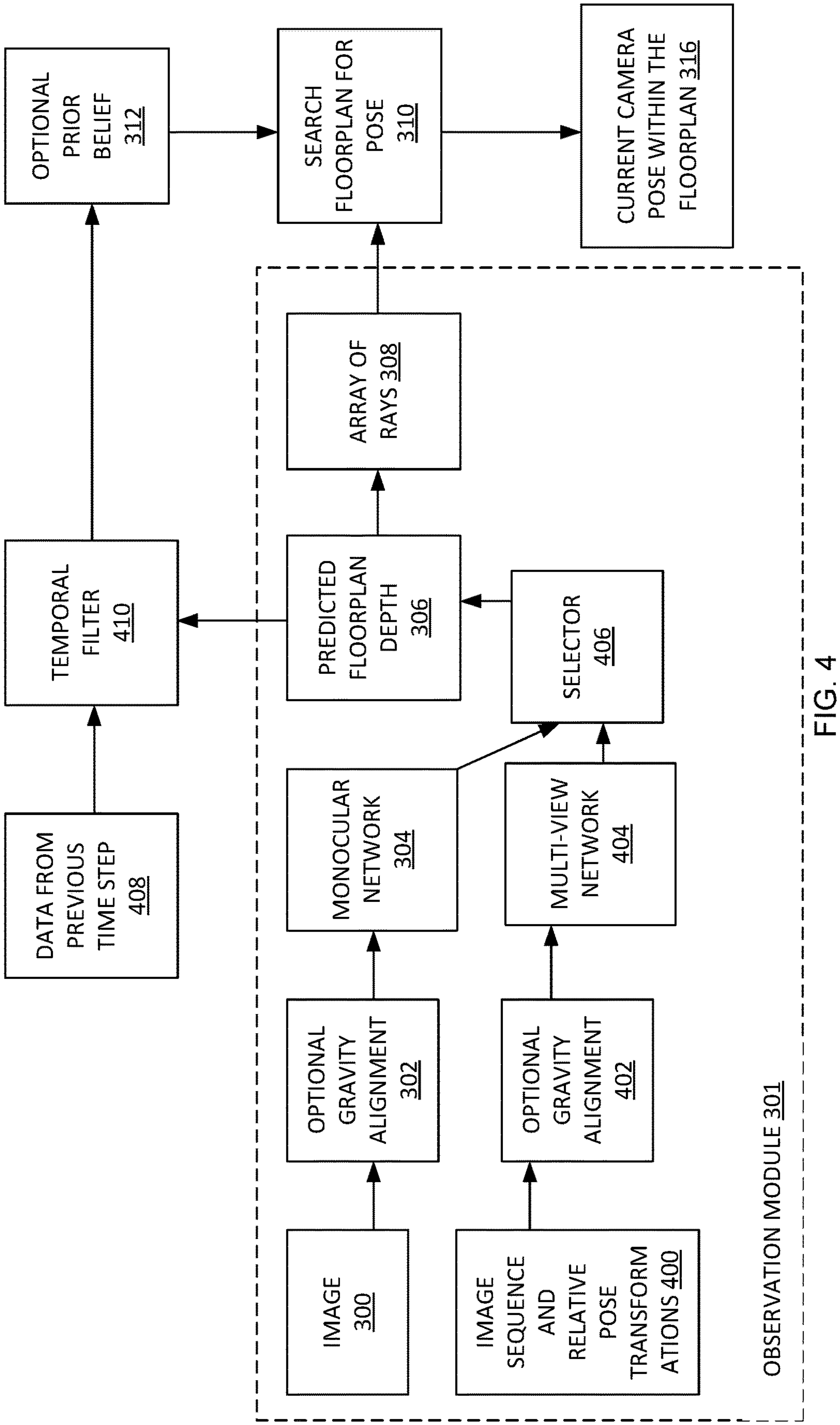
FIG. 4 is a flow diagram of a process of visual localization using a monocular network and a multi-view network as well as a temporal filter.

FIG. 4 is a flow diagram of a process of visual localization using a monocular network 304 such as the monocular network 304 of FIG. 3 and a multi-view network 404 as well as an optional temporal filter 410. In the example of FIG. 4 the trained neural network comprises a second neural network (the multi-view network) which computes the predicted array of rays from a sequence of images captured by the camera moving in the environment as well as, for each image in the sequence, a known relative pose of the camera.

In the example of FIG. 4 the observation module 301 of the visual localization service has the same operations as in the example of FIG. 3 and also including additional operations as now explained.

The multi-view network 404 is a neural network which takes as input an image sequence and relative pose transformations of the camera which captured the images of the image sequence as the camera was moving in the environment. The images in the sequence are captured using the same camera that captured the image of scene 300. The image of scene 300 may be one of the images in the image sequence 400. The images in the sequence depict an environment or scene for which a 2D floorplan is available to the visual localization service. The images of the image sequence are optionally gravity aligned using a gravity alignment process 402 as described for operation 302.

The multi-view network 404 comprises an image feature extraction neural network such as a residual neural network, a convolutional neural network, a multi-layer perceptron or other feature extraction neural network. The feature extraction neural network extracts features of columns of the images in the image sequence. The image feature extraction neural network has a structure similar to the monocular network 304.

The multi-view network 404 also comprises an attention based network, and optionally a gravity alignment mask is used in the attention. With multiple depth hypotheses, the column features from different images in the sequence are gathered via plane sweeping into a reference frame. A variance of the column features across the images in the sequence, referred to as a cross-view feature variance, forms a cost distribution over the depth hypothesis. The observability of the column features at different depth hypotheses is combined to compute a variance. The cost distribution is 2D rather than 3D which brings computational efficiencies. As a consequence, a learned cost filter is a 2D convolution rather than 3D. Thus the second neural network (the multi view network) uses a learned cost filter which is a 2D convolution and is therefore very computationally efficient to compute and yet is found to give accurate results. A soft-argmin computes the final floorplan depth from the cost distribution as:

$$d = d_{hyp}^{T}\mathrm{softmax}(-c) \qquad \text{(equation 1)}$$

where $d_{hyp} \in \mathbb{R}^{D}$ is the vector containing the D depth hypotheses, $c \in \mathbb{R}^{D}$ is the cost at each hypothesis, and softmax $(-c)$ is the probability of each hypothesis. Equation 1 is expressed in words as the depth is equal to the transpose of a vector containing a plurality of depth hypotheses multiplied by the probability of each hypothesis.

In one example, the image feature extraction neural network uses the first two blocks of ResNet50 and applies attention only to the respective image column. As described above for the monocular network, the features which are extracted serve as keys and values while an average pooling is applied vertically per column to form queries. A positional encoding for keys and values is mapped from the corresponding vertical coordinate. The attention outputs the image column features using a plurality of channels per feature. The features are gathered before forming a cost volume. In some examples the cost volume is subsequently filtered using temporal filter 410 as explained below.

The multi-view network 404 predicts a floorplan depth which is input to a selector neural network 406 together with a predicted floorplan depth from the monocular neural network 304.

The inventors recognize that, while monocular depth estimation (as in the monocular network 304) is independent of camera motion but prone to scale ambiguity, multiview stereo approaches (as in the multi view network 404) deliver correct scale, but rely on sufficient baselines and camera overlap. Based on these observations, a selector 406 neural network such as a multi-layer perceptron (MLP) is used that softly selects from the two predictions (i.e. the prediction from the monocular network 304 and the prediction from the multi-view network 404). The selector 406 takes the relative poses of the images in the sequence and the estimated multiview and monocular floorplan depth as inputs and outputs corresponding weight for the two estimates. The probability distributions are then fused as the weighted average, i.e., $$P_{fuse} = w P_{mono} + (1 - w) P_{mv}, \qquad \text{(equation 2)}$$

where $0 \leq w \leq 1$ is the output by the selector 406, $P_{mono}$ and $P_{mv}$ denote the probability distributions from a single and multi view, respectively. The expectation of the fused probability distribution $P_{fuse}$ then provides the final depth prediction 306. Equation 2 is expressed in words as, the fused probability distribution of depth from the camera to the surface denoted in the floorplan over a range of depth hypotheses is equal to a weight times the probability distribution of the depth from the camera to the surface denoted in the floorplan over a range of depth hypotheses computed by the monocular network 304 plus one minus the weight times the probability distribution of the depth from the camera to the surface denoted in the floorplan over a range of depth hypotheses.

In an example the selector 406 is a multi layer perceptron with two hidden layers. It takes the relative poses (x, y and heading) between the images in the input sequence and the mean floorplan depth predictions of the monocular network 304 and multi-view network 404 as input. It outputs a pair of weights for the monocular and the multi-view probability volume.

The selector neural network has been trained as explained in more detail below.

An array of rays is computed from the predicted floorplan depth 306 as explained with reference to FIG. 3. The array of rays is used to search 310 in the floorplan for a pose that agrees with the array of rays. The search is optionally constrained using a prior belief 312 of the pose of the camera. The result of the search is the current camera pose 316 within the floorplan which is output and/or stored by the visual localization service.

In some examples, a temporal filter 410 is used. The temporal filter enables data from a previous time step 408 to be taken into account. In some examples the temporal filter is a histogram filter. In examples the temporal filter operates in special Euclidean group SE(2) which gives significant efficiency gains as compared to special Euclidean group SE(3) without loss of accuracy. SE(3) is a rotation in three dimensional space and three dimensional position. SE(2) is a rotation in two dimensional space and two dimensional position. SE(2) is sufficient for floorplan localization. The temporal filter computes the prior belief 312 in some examples, using data from a previous time step, and by applying different 2D translation filters for different possible orientations of the camera. This approach of using different 2D translation filters is found to be very effective in practice.

In an example the temporal filter 410 keeps track of the posterior over the entire floorplan as now explained. Take the predicted floorplan depth as an observation and the following observation model $$p(s_t|o_t) = e^{-\|\hat{r}-r_{s_t}\|_1}, \quad \text{(equation 3)}$$

Where $r_{s_t}$ is the floorplan ray at pose $s_t$ and $\hat{r}$ is the interpolated ray from the floorplan depth prediction. Equation 3 is expressed in words as the probability of camera pose $s_t$ given $o_t$ where $o_t$ is the observation likelihood at timestep t and indicates how likely the current observations are for a given pose at time t. This type of likelihood may be assigned for each possible pose. As the poses are given as a fixed discrete set this can be interpreted as a histogram, hence, the name histogram filtering going from s_t−1 and o_t to s_t.

Is equal to e to the power minus the L1 loss between the interpolated ray from the floorplan depth prediction and the observed floorplan ray at pose $s_t$. Use the relative pose between frames, i.e., ego-motion as the transition model:

$$s_{t+1} = s_t \oplus t_t + \omega_t, \quad \text{(equation 4)}$$

where $t_t=[t_{x,t}, t_{y,t}, t_{\phi,t}]$ and $\omega_t=[\omega_{x,t}, \omega_{y,t}, \omega_{\phi,t}]$ are the ego-motion and transition noise at time t, respectively, the operator $\oplus$ applies an ego-motion on a state. Equation 4 is expressed in words as the observed floorplan ray at time t+1 is equal to the observed floorplan ray at time t applied as an egomotion on state t plus transition noise @t.

Further assuming the transition noise $\omega_t$ obeys a Gaussian distribution, the transition probability is expressed as:

$$p(s_{t+1}|s_t, t_t) = e^{-\frac{1}{2}(s_{t+1}-s_t\oplus t_t)^\top \Sigma^{-1}(s_{t+1}-s_t\oplus t_t)}, \quad \text{(equation 5)}$$

where the visual localization service models $$\sum = \mathrm{diag}(\sigma_x^2, \sigma_y^2, \sigma_\phi^2)$$

as covariance of a Gaussian distribution. Equation 5 is expressed in words as the probability of the pose at time t+1 given the pose at time t and given the egomotion at time t is equal to the mean of a Gaussian distribution over the poses s at time t+1. A Gaussian distribution is denoted P(x)=1/C exp{−½*(x−mu)^t Sigma^−1(x−mu)}. Where mu is the mean of the Gaussian distribution, Sigma the covariance matrix and C a normalization factor to make the integral over all x in X (where x is defined) equal to 1. It is possible to remove this factor since it is not necessary for the updates and finding the best pose (maximal value of P(x)=>highest likelihood for x). Here the Gaussian is over the poses s at time t+1. Thus the 'mean' is here taken as s_t+t_t to define the likelihood for s_t+1.

Applying Bayes rule yields:

$$p(s_{t+1}|o_t, t_t) = \frac{1}{Z}\sum_{s_t} p(s_{t+1}|s_t, t_t)p(s_t|o_t), \quad \text{(equation 6)}$$

where Z is a normalization factor. Equation 6 is expressed in words as the probability of the camera pose at the next time step, given the orientation and the ego-motion for time t is equal to one over a normalization factor times the sum of the posterior probabilities over all previous states s_t[p(s_t|o_t) times the transition likelihood [p(s_t+1|s_t, t_t))] to go from the previous state s_t to state s_t+1.

In the following, drop the subscripts indicating the time-step for simplicity. The histogram filter represents the posterior as a 3D probability volume containing the probability of being at pose $[s_x, s_y, s_\phi]$. The transition is implemented as transition filters. The visual localization service operates using SE(2) and transits through ego-motions, so the translation in the world frame depends on the current orientation. Therefore, the visual location service decouples the translation and rotation and applies different 2D translation filters for different orientations, before applying the rotation filter to the entire volume along the orientation axis. The 2D translation step is implemented efficiently as a grouped convolution in some examples, where each orientation is a group. The translational filter $T_\phi$ for orientation $\phi$ is computed through:

$$T_\phi(x, y) = e^{-\frac{1}{2}\delta t^\top diag(\sigma_x^2, \sigma_y^2)^{-1}\delta t}, \quad \text{(equation 7)}$$

-continued where $$\delta t = R_{s_\phi}^{-1}[s_x, s_y]^\top - [t_x, t_y]^\top \quad \text{(equation 8)}$$

With $R_{s_\phi} \in \mathbb{R}^{2\times 2}$ being the rotation matrix with angle $s_\phi$. The rotational filter r is $$r(\phi) = e^{-\frac{1}{2}(\phi - t_\phi)^2/\sigma_\phi^2}. \quad \text{(equation 9)}$$

The pose posterior corresponds to the filtered probability volume and it is possible to obtain the (best) pose prediction and its uncertainty by a lookup.

The use of a temporal filter improves the functioning of the underlying computing device by facilitating the search within the floorplan for the camera pose.

Figure 5:
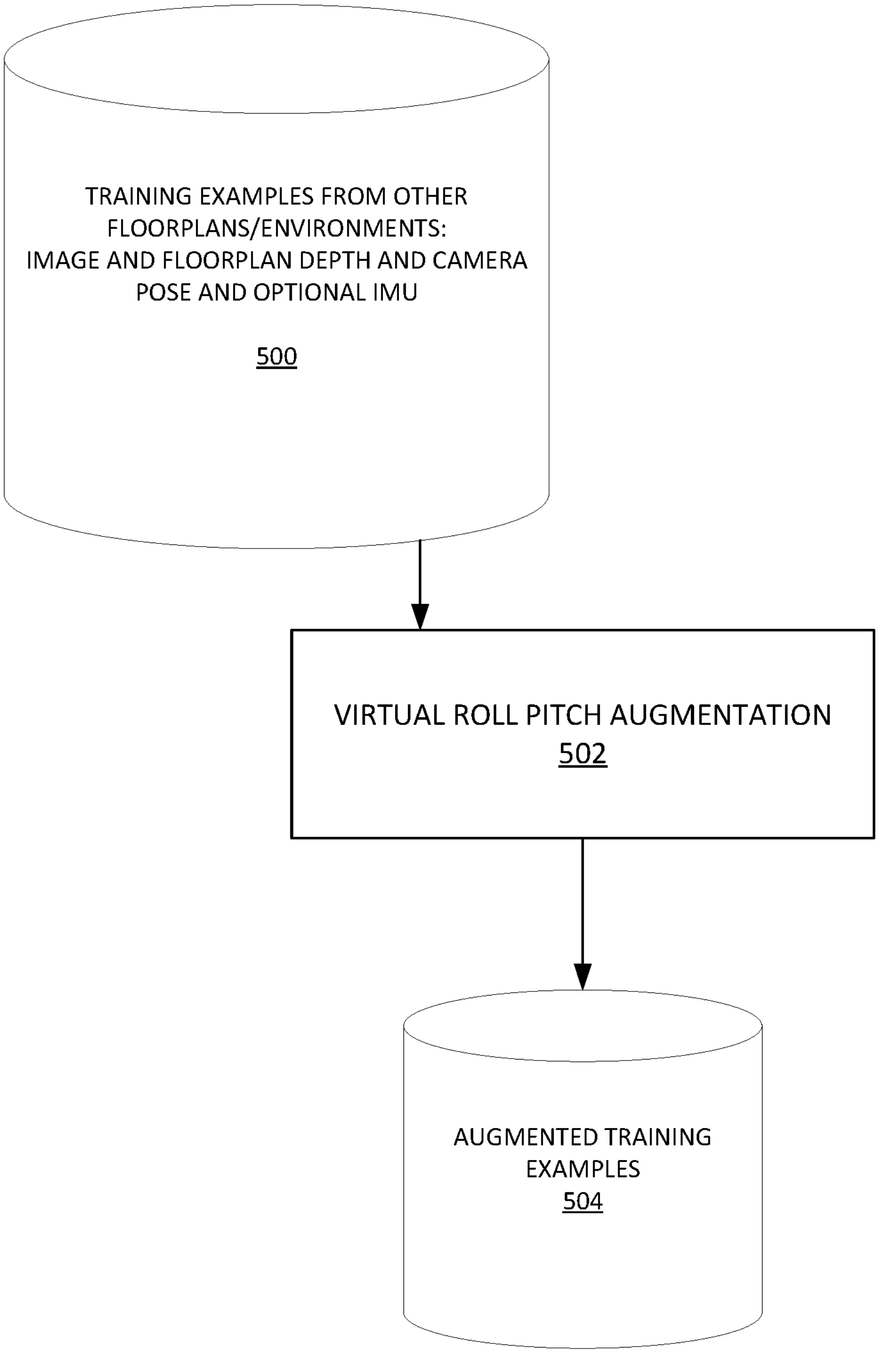
FIG. 5 is a flow diagram of a method of computing augmented training examples.

FIG. 5 is a flow diagram of a method of computing augmented training examples. As mentioned above, the machine learning model itself may be trained using training data that is augmented synthetically to allow for different roll or pitch of a camera and this improves accuracy of the visual localization process where low cost sensors are used which may not be upright in use. Detail about how the synthetic augmentation is done is now given.

Training examples 500 are collected and stored in a database or other store. The training examples are from one or more other environments (other than the one to be used at test time, also referred to as inference time, when the visual localization service is used) are obtained. Each training example comprises a single image depicting the environment, or a sequence of images depicting the environment captured by a camera moving in the environment. Optionally each training example has gravity sensor data obtained from a gravity sensor such as an IMU associated with the camera. Where the training example has a single image, there is an associated camera pose, which is a 3D position and orientation of a camera which captured the image, where the camera pose is with respect to a known 2D floorplan of the environment. Where the training example has a sequence of images there is an associated camera pose for each image in the sequence. Again the camera poses are with respect to a known 2D floorplan of the environment. In an example, the training examples comprise perspective images of 108 degree horizontal field of view in an indoor simulation environment. However, it is not essential to use an indoor simulation environment as real images captured in a real environment are used in some cases. In an example the training examples are from a public dataset such as iGibson although this is not essential.

To cope with non-upright camera poses an optional augmentation technique is used comprising virtual roll pitch angle simulation. A virtual roll pitch augmentation 502 is applied to a plurality of the training examples to form augmented training examples 504. To apply virtual roll pitch augmentation 502 to an image from the training examples 500, equation 10 is used. Perspective images with the same principle point and different viewing angles relate to each other through a simple homography. With known camera intrinsic matrix K, camera roll and pitch angle «, θ, the homography from the original image to a gravity-aligned image is $$\hat{p} = KRK^{-1}p, \quad \text{(equation 10)}$$

where p, p̂ are the homogeneous image coordinates of the original pixel and the corresponding pixel in the gravity-aligned image, R is the rotation matrix to the gravity-aligned pose. To simulate the virtual roll pitch angle, use equation 10 to calculate which pixel is observable at angle ψ, θ and mask out the unobservable ones. This is equivalent to the gravity-alignment of the image taken at angle ψ, θ. Equation 10 is expressed in words as the image coordinates of a pixel in a gravity aligned image is equal to the camera intrinsic matrix K times the rotation matrix, times the transpose of the camera intrinsic matrix, to the power minus one, times the pixel.

Figure 6:
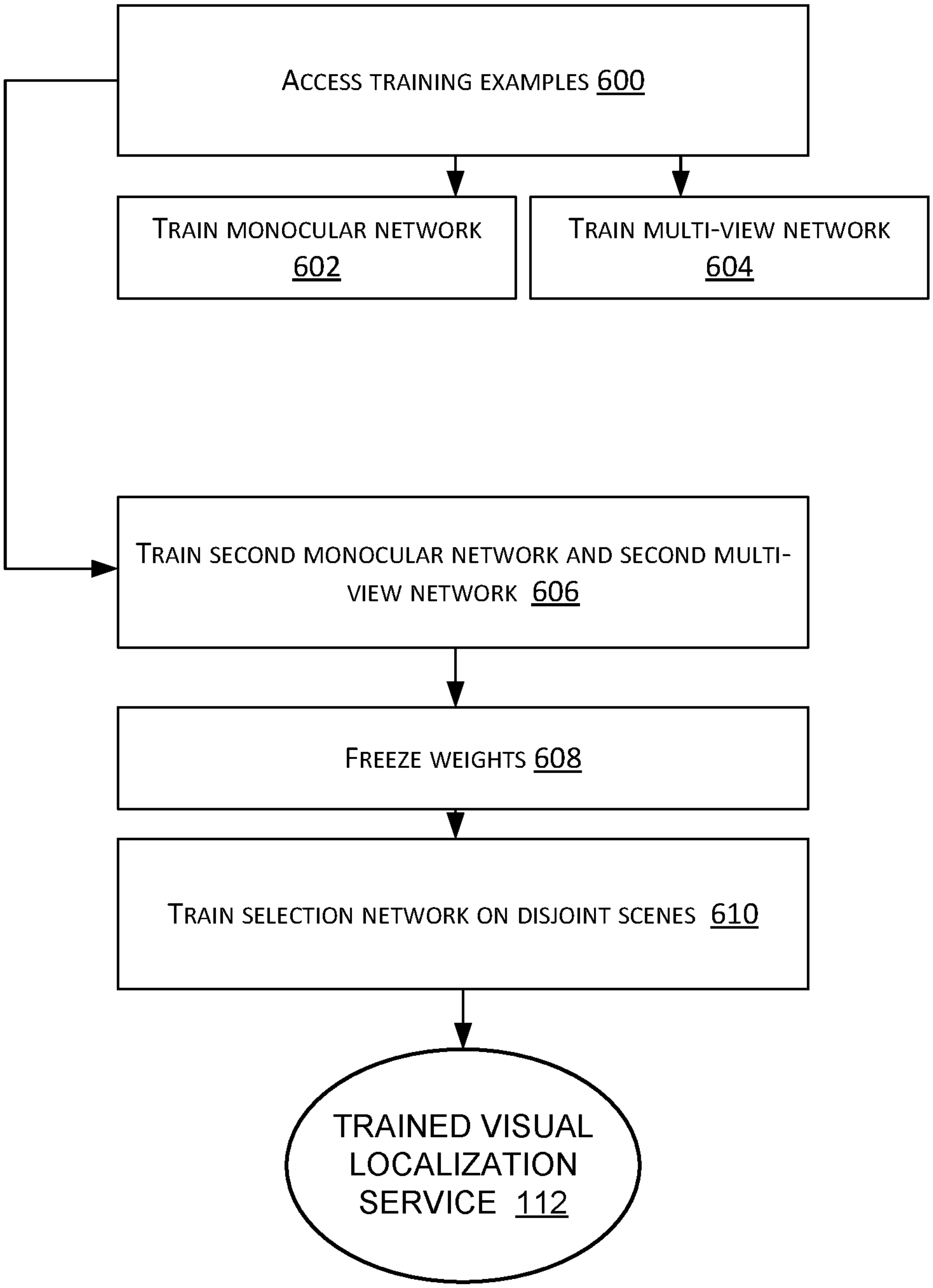
FIG. 6 is a flow diagram of a method of training a visual localization service.

FIG. 6 is a flow diagram of a method of training a visual localization service. Training examples are accessed such as the training examples 500 or the augmented training examples 504 as described with reference to FIG. 5.

The monocular network is trained 602 using supervised training and using the training examples described with reference to FIG. 5. In examples where a multi-view network is used it is also trained 604 using supervised training and using the training examples described with reference to FIG. 5. The monocular network and the multi-view network may be trained in parallel as indicated in FIG. 6. The loss function for the supervised training of the multi-view network is an L1 loss to the ground truth floorplan or other suitable loss. The loss function for the supervised training of the monocular network is an L1 loss to the ground truth floorplan with an optional added shape loss computed as the cosine similarity, i.e., $$\mathcal{L} = \|d, d^*\|_1 + \lambda \frac{d^\top d^*}{\max\{\|d\|_2 \|d^*\|_2, \epsilon\}}, \quad \text{(equation 11)}$$

where d, d* are the predicted and the ground truth depth and e denotes a small constant to prevent from division by zero.

In order to train the selector 406 the training examples accessed at operation 600 are used to train 606 a second monocular network and a second multi-view network. The weights of the second monocular network and the second multi-view network are frozen 608. The selection network is then trained 610 using supervised learning on disjoint scenes producing a trained visual localization service 112. The trained visual localization service comprises the first monocular network, the first multi view network, and the selector. In some examples the trained visual localization service comprises only the first monocular network. The second monocular network and the second multi-view network are not used in the test time interference process such as that of FIGS. 3 and 4.

By training on disjoint scenes the selection network is prevented from being biased by both the second monocular network and the second multi-view network's performance on visited scenes (i.e. scenes depicted in the training data they were trained on). Disjoint scenes means scenes that are not present in training data used to train the second monocular network and the second multi-view network. In the process of FIG. 6 any suitable supervised learning process is used such as backpropagation.

Experiments found that the monocular network localization accuracy (the example of FIG. 3) produces almost 200% improvement in accuracy of camera pose as compared with two baselines (a first baseline being PF-Net and a second being LASER). Experiments found that including the multi view network (the example of FIG. 4) performed more accurately than the example of FIG. 3. Experiments found that using virtual roll pitch augmentation increased the robustness for non-upright poses.

The examples give a data-driven and probabilistic model for localization within a floorplan. The visual localization service is more practical than previous methods, using in some examples, only consumer hardware, perspective red green blue (RGB) images and non-upright camera poses, while operating at very high frame-rates (around 30 frames per second or more). IMU data, or other gravity sensor data, is used where non-upright camera poses are allowed for. The visual localization service allows for both accurate single-frame and sequential localization in unvisited environments. It outperforms the state-of-the-art in both tasks across different datasets and various metrics by a significant margin. The visual localization service is useful in many indoor AR/VR applications and boosts robot autonomy in indoor environments.

Figure 7:
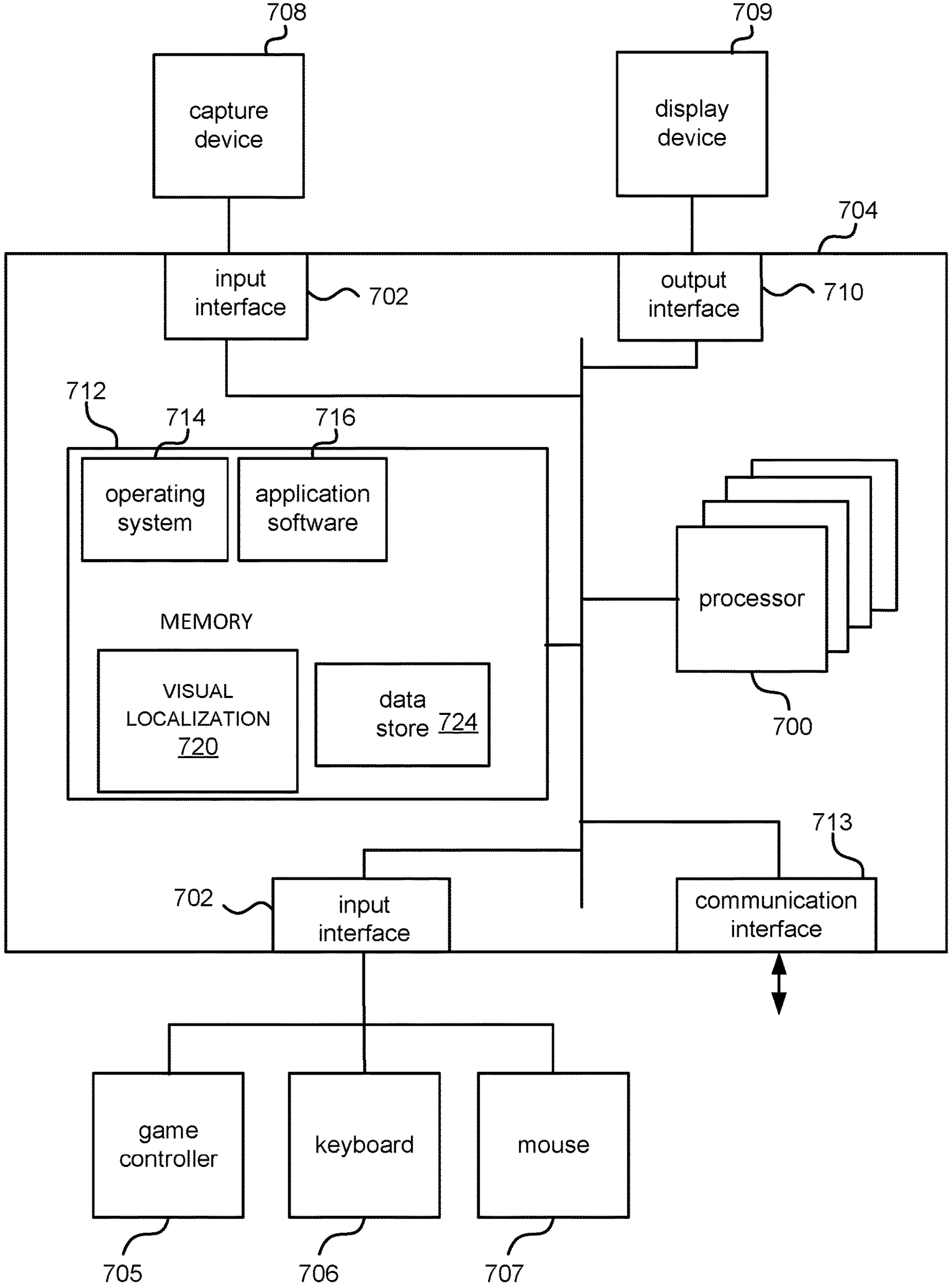
FIG. 7 illustrates an exemplary computing-based device in which examples of visual localization functionality are implemented.

FIG. 7 illustrates various components of an exemplary computing-based device 704 which is implemented as any form of a computing and/or electronic device, and in which examples of a visual localization service are implemented. A non-exhaustive list of examples of the computing-based device 704 is camera phone, physical robot, self-driving vehicle, unmanned aerial vehicle, head worn computer, augmented reality computer, game console.

Computing-based device 704 comprises one or more processors 700 which are microprocessors, controllers or any other suitable type of processors for processing computer executable instructions to control the operation of the device in order to compute 3D position and orientation of a camera with respect to a 2D floorplan. In some examples, for example where a system on a chip architecture is used, the processors 700 include one or more fixed function blocks (also referred to as accelerators) which implement a part of the method of any of FIGS. 3, 4, 5, 6 in hardware (rather than software or firmware). A visual localization service 720 is instantiated on the computing-based device 704. Platform software comprising an operating system 714 or any other suitable platform software is provided at the computing-based device to enable application software 716 to be executed on the device.

The computer executable instructions are provided using any computer-readable media that is accessible by computing based device 704. Computer-readable media includes, for example, computer storage media such as memory 712 and communications media. Computer storage media, such as memory 712, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium does not include a propagating signal. Although the computer storage media (memory 712) is shown within the computing-based device 704 it will be appreciated that the storage is, in some examples, distributed or located remotely and accessed via a network or other communication link (e.g. using communication interface 713). Data store 724 in memory 712 holds images, sequences of images, camera poses, 2D floorplans, arrays of rays and other data.

The computing-based device 704 also comprises an input interface 702 and an output interface 710. Output interface 710 is arranged to output display information to a display device 709 which may be separate from or integral to the computing-based device 704. The display information may provide a graphical user interface, augmented reality display or other display. The input interface 702 is arranged to receive and process input from a capture device 708 such as a camera, gravity sensor or other capture device. Input interface 702 also receives input from one or more devices, such as a user input device (e.g. a mouse 707, keyboard 706, game controller 705). In some examples the input interface 702 detects voice input, user gestures or other user actions and provides a natural user interface (NUI). In an example the display device 709 also acts as a user input device if it is a touch sensitive display device.

Any of the input interface 702, output interface 710, display device 709 and the user input devices 705, 706, 707 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following clauses:

Clause A. A method comprising:

accessing a floorplan of an environment;

receiving an image of the environment, the image having a viewpoint of a camera in the environment;

inputting the image to a trained neural network to predict an array of rays from the camera to surfaces in the environment indicated in the floorplan;

computing a two dimensional (2D) position and 3D orientation of the camera with respect to the floorplan from the array of rays.

Clause B. The method of clause A wherein the array of rays is independent of parameters intrinsic to the camera.

Clause C. The method of any preceding clause wherein computing the position and orientation of the camera with respect to the floorplan comprises searching for a pose in the floorplan that has the most similar rays as the predicted array of rays.

Clause D. The method of any preceding clause comprising, prior to inputting the image to the trained neural network, aligning the image with a gravity direction, the gravity direction being received from a sensor associated with the camera.

Clause E. The method of any preceding clause wherein the trained neural network has been trained using other floorplans and wherein the training omits information about the floorplan and omits images captured in the environment.

Clause F. The method of clause E wherein the images comprise at least one synthetic image computed by updating one of the images according to an adjusted roll or an adjusted pitch of the camera.

Clause G. The method of any preceding clause wherein the trained neural network comprises a first neural network which computes the predicted array of rays from only one image.

Clause H. The method of clause G comprising, prior to inputting the image to the trained neural network, aligning the image with a gravity direction, the gravity direction being received from a sensor associated with the camera, and using an attention mechanism of the first neural network to mask out pixels that become unobservable by the alignment of the image with the gravity direction.

Clause I. The method of any preceding clause wherein the trained neural network comprises a second neural network which computes the predicted array of rays from a sequence of images captured by the camera moving in the environment as well as, for each image in the sequence, a known relative pose of the camera.

Clause J. The method of clause I wherein the second neural network uses a learned cost filter which is a two dimensional (2D) convolution.

Clause K. The method of any preceding clause wherein the trained neural network comprises a first neural network and a second neural network and a selector neural network, the selector neural network arranged to predict weights used to compute a weighted combination of the predictions of the first neural network and the second neural network.

Clause L. The method of any preceding clause wherein computing the position and orientation of the camera with respect to the floorplan is done using the array of rays and a prior belief of the position and orientation of the camera with respect to the floorplan.

Clause M. The method of clause L comprising computing the prior belief using a temporal filter, using data from a previous time step, wherein the temporal filter operates in SE(2).

Clause N. The method of clause L or clause M comprising computing the prior belief using a temporal filter, using data from a previous time step, wherein the temporal filter applies different 2D translation filters for different orientations.

Clause O. An apparatus comprising:

a processor;

a memory storing instructions that, when executed by the processor, perform a method comprising:

accessing a floorplan of an environment;

receiving an image of the environment, the image depicting a viewpoint of a camera in the environment;

inputting the image to a trained neural network to predict an array of rays from the camera to surfaces in the environment indicated in the floorplan, wherein the trained neural network has been trained omitting information about the environment;

computing a two dimensional (2D) position and orientation of the camera with respect to the floorplan from the array of rays.

Clause P. The apparatus of clause O being a camera phone or a head mounted display device.

Clause Q. The apparatus of clause O or clause P wherein computing the position and orientation of the camera with respect to the floorplan from the array of rays comprises using a prior belief of the position and orientation of the camera with respect to the floorplan.

Clause R. The apparatus of any of clauses O to Q wherein the prior belief is obtained from a temporal filter.

Clause S. A mobile or portable, or wearable computing device comprising a processor;

a memory storing instructions that, when executed by the processor, perform a method comprising:

accessing a floorplan of an environment;

receiving an image of the environment captured by a camera in the environment;

inputting the image to a trained neural network to predict an array of rays from the camera to surfaces in the environment indicated in the floorplan;

computing a two dimensional (2D) position and orientation of the camera with respect to the floorplan from the array of rays and updating a belief of the position and orientation of the camera with respect to the floorplan.

Clause T. The device of claim 19 operable in a previously unvisited environment at 30 frames per second or higher.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method comprising:

accessing a floorplan of an environment;

receiving an image of the environment, the image having a viewpoint of a camera in the environment;

aligning the image with a gravity direction, the gravity direction being received from a sensor associated with the camera, and using an attention mechanism of a trained neural network to mask out pixels that become unobservable by the alignment of the image with the gravity direction;

inputting the aligned image to the trained neural network to predict an array of rays from the camera to surfaces in the environment indicated in the floorplan; and computing a two dimensional (2D) position and orientation of the camera with respect to the floorplan from the array of rays.

2. The method of claim 1 wherein the array of rays is independent of parameters intrinsic to the camera.

3. The method of claim 1 wherein computing the position and orientation of the camera with respect to the floorplan comprises searching for a pose in the floorplan that has the most similar rays as the predicted array of rays.

4. The method of claim 1 wherein the method is performed by a camera phone or a head mounted display device.

5. The method of claim 1 wherein the trained neural network has been trained using other floorplans and wherein the training omits information about the floorplan and omits images captured in the environment.

6. The method of claim 5 wherein the images captured in the environment comprise at least one synthetic image computed by updating one of the images captured in the environment according to an adjusted roll or an adjusted pitch of the camera.

7. The method of claim 1 wherein the trained neural network predicts the array of rays from only one image.

8. The method of claim 1 wherein the trained neural network predicts the array of rays from a sequence of images captured by the camera moving in the environment as well as, for each image in the sequence, a known relative pose of the camera.

9. The method of claim 8 wherein the trained neural network uses a learned cost filter which is a two dimensional (2D) convolution.

10. The method of claim 1 wherein the trained neural network comprises a first neural network and a second neural network and a selector neural network, the selector neural network arranged to predict weights used to compute a weighted combination of the predictions of the first neural network and the second neural network.

11. The method of claim 1 wherein computing the position and orientation of the camera with respect to the floorplan is done using the array of rays and a prior belief of the position and orientation of the camera with respect to the floorplan.

12. The method of claim 11 comprising computing the prior belief using a temporal filter, using data from a previous time step, wherein the temporal filter operates in special Euclidean group SE(2).

13. The method of claim 11 comprising computing the prior belief using a temporal filter, using data from a previous time step, wherein the temporal filter applies different 2D translation filters for different orientations.

14. An apparatus comprising:

a processor; and a memory storing instructions that, when executed by the processor, perform a method comprising:

accessing a floorplan of an environment;

receiving an image of the environment, the image depicting a viewpoint of a camera in the environment;

aligning the image with a gravity direction, the gravity direction being received from a sensor associated with the camera, and using an attention mechanism of a trained neural network to mask out pixels that become unobservable by the alignment of the image with the gravity direction;

inputting the aligned image to the trained neural network to predict an array of rays from the camera to surfaces in the environment indicated in the floorplan, wherein the trained neural network has been trained omitting information about the environment; and computing a two dimensional (2D) position and orientation of the camera with respect to the floorplan from the array of rays.

15. The apparatus of claim 14 being a camera phone or a head mounted display device.

16. The apparatus of claim 14 wherein computing the position and orientation of the camera with respect to the floorplan from the array of rays comprises using a prior belief of the position and orientation of the camera with respect to the floorplan.

17. The apparatus of claim 16 wherein the prior belief is obtained from a temporal filter.

18. A mobile or portable, or wearable computing device comprising:

a processor; and a memory storing instructions that, when executed by the processor, perform a method comprising:

accessing a floorplan of an environment;

receiving an image of the environment captured by a camera in the environment;

providing the image to a trained neural network to predict an array of rays from a sequence of images captured by the camera moving in the environment and, for each image in the sequence, a known relative pose of the camera, wherein the trained neural network uses a learned cost filter which is a two dimensional (2D) convolution; and computing a 2D position and orientation of the camera with respect to the floorplan from the array of rays and updating a belief of the position and orientation of the camera with respect to the floorplan.

19. The device of claim 18 operable in a previously unvisited environment at 30 frames per second or higher.

20. The device of claim 18 wherein computing the 2D position and orientation of the camera with respect to the floorplan comprises searching for a pose in the floorplan that has the most similar rays as the predicted array of rays.

* * * * *